United States Patent [19]
McDougald

[11] Patent Number: 5,431,809
[45] Date of Patent: Jul. 11, 1995

[54] APPARATUS FOR SEALING A TRAVELING BRIDGE FILTER BACKWASH SHOE

[75] Inventor: Mack McDougald, Ochlocknee, Ga.

[73] Assignee: Davis Water & Waste Industries, Inc., Thomasville, Ga.

[21] Appl. No.: 179,693

[22] Filed: Jan. 11, 1994

[51] Int. Cl.⁶ .............................................. B01D 24/46
[52] U.S. Cl. .................... 210/108; 210/264; 210/275
[58] Field of Search .............. 210/108, 264, 273, 275, 210/292

[56] References Cited

U.S. PATENT DOCUMENTS

| | | | |
|---|---|---|---|
| 2,302,450 | 11/1942 | Laughlin | 210/264 |
| 4,152,265 | 5/1979 | Meyers | 210/264 |
| 4,450,077 | 5/1984 | Black et al. | 210/275 |
| 4,454,034 | 6/1984 | Astrom et al. | 210/108 |
| 4,540,487 | 9/1985 | Johnson et al. | 210/264 |
| 4,859,330 | 8/1989 | Pauwels | 210/264 |
| 4,957,631 | 9/1990 | Pauwels | 210/264 |
| 4,988,439 | 1/1991 | Medders | 210/264 |
| 5,078,873 | 1/1992 | Black et al. | 210/264 |

Primary Examiner—Ivars Cintins
Attorney, Agent, or Firm—Nixon & Vanderhye

[57] ABSTRACT

A traveling bridge filtration system includes a tank configured to include a plurality of side-by-side filter cells all extending longitudinally in a first direction, and a common filtrate channel extending longitudinally in a second direction perpendicular to the first direction. Each filter cell has an outlet extending through an interior wall of the tank thereby establishing fluid communication with the filtrate channel. A traveling bridge is mounted atop the tank and movable from cell to cell in the second direction. A backwash pump, having an inlet and a discharge pipe connected to a backwash shoe, is pivotally suspended from the bridge within the filtrate channel. A fluid operated bellows is used for moving the backwash shoe selectively into sealing engagement with a tank wall surface surrounding one of the filter cell outlets in response to actuation of the backwash pump. A related method of use is also disclosed.

11 Claims, 3 Drawing Sheets

APPARATUS FOR SEALING A TRAVELING BRIDGE FILTER BACKWASH SHOE

BACKGROUND AND SUMMARY OF THE INVENTION

The present invention relates to a traveling bridge filter system and more specifically, to a unique method and apparatus for effecting sealing engagement between a backwash shoe and an interior partition wall of a filtration tank.

It is well known in the water and waste water filtration field to utilize tanks divided into a plurality of filter cells, one adjacent the other, and all containing a multilayer or single layer arrangement of granular filter media such as sand, gravel, and the like. In downward or gravity filtration systems of this type, water or other liquid containing suspended particles is introduced into the filtration tank from above, and filtered water is drawn off from a chamber (also referred to herein as a filtrate channel) either directly beneath, or adjacent and below the individual filter cells. In other words, in some instances, a common filtrate chamber extends beneath all of the filter bed cells. In other instances, and including the preferred arrangement here, the cell partitions extend below the cells to the bottom wall or floor of the tank, and each individual cell has a outlet port or header which permits the filtrate to flow out of the cell and into a common filtrate channel extending along the filter cells, in the longitudinal direction of the tank.

During downward flow through the individual cells, particulate matter is entrapped within the layer or layers of granular filter media. Eventually, however, the particulate matter will clog the filter media, thereby impairing the filtering capability of the system. Thus, there is a need for periodic cleaning of the individual filter cells, typically by way of a backwash operation where backwash liquid is reverse flowed through the filter cells, one after the other, until the entire tank has been backwashed. It is also known to maintain such units in continuous operation during cleaning of individual cells, through the use of a traveling bridge device which moves from one filter cell to the next, backwashing individual cells while permitting the normal filtration process to continue in the remaining cells.

The overall construction of the filtration tank of this invention is generally similar to that described in commonly owned U.S. Pat. No. 4,859,330, incorporated herein by reference. In that patent, a combined backwash/air scour system is disclosed, but the general arrangement of the tank, filter cells and traveling bridge is similar. Generally, the tank is of rectangular shape, with longitudinal side walls and transverse end walls. An interior partition wall extending between the end walls and parallel to the side walls (closer to one side wall than the other) divides the tank into a filtrate channel running along side the cells in the longitudinal direction of the tank. Each cell, defined by transverse partitions extending between the interior partition wall and the other side wall, has an outlet port below the filter media in the cell and communicating with the filtrate channel through the interior partition wall, also referred to herein as the channel wall.

In typical gravity flow filtration systems of this type, the associated traveling bridge includes a collection hood which is adapted to seal against or at least come into close proximity to the partitions forming each cell, and this collection hood serves to carry away the backwash water flowing upwardly through the cell. The bridge also carries a backwash pump which is submerged within the adjacent filtrate channel, and which supplies backwash water to each cell. A backwash shoe mechanism is connected to the pump discharge pipe and includes an outlet which is adapted to align with individual cell outlets. The backwash shoe is held in continuous engagement with the interior partition or channel wall of the tank so that backwash water can be pumped into the individual cell outlets in a direction counter to normal filtration flow, as the bridge moves successively to each cell.

The conventional method of sealing the backwash shoe to the backwash port or cell outlet is by spring tension applied in various ways, to force the shoe against the channel wall. Systems utilizing this design apply this spring tension continuously, causing the backwash shoe (which moves with the traveling bridge), to slide against the stationary wall during the entire backwash operation.

In order to reduce wear caused by the backwash shoe sliding against the wall, wear strips are attached to the backwash shoe and to the channel wall. The wear strips are hard plastic and have a flat sealing face. To effect a seal between the backwash shoe and the cell port or outlet, it is necessary that the sealing surfaces be perfectly flat and in perfect alignment with one another. In addition, sufficient spring tension must be applied to overcome back thrust resulting from the operating pressure applied to the inside of the backwash shoe. Otherwise, the shoe will not seal properly, thereby allowing a portion of the backwash water to bypass into the filtrate channel, adversely effecting the backwash cleaning of the filter media in the cell.

Due to the nature of the operating service of these types of devices, it is inevitable that sand and grit will enter the system and cause accelerated wear between the sliding backwash shoe and the stationary liner on the channel wall. As the mating faces wear, friction between the two components increases, causing an additional side load on the traveling bridge, and increasing the bypassing of backwash water around the mating surfaces of the wear strips.

In addition, the application of spring tension to the backwash shoe transmits an offset load to one side of the traveling bridge mechanism to which the backwash shoe assembly is attached in a cantilevered manner. The offset side load imparted to the bridge can cause problems with bridge tracking on the bridge guide rails, further complicating alignment of the backwash shoe and adversely affecting the sealing of the backwash shoe to the channel wall. Excessive side load imparted to the traveling bridge can even cause derailment of the bridge.

In order to eliminate the problems outlined above, this invention incorporates a positive means for mechanically sealing the backwash shoe to the channel wall. The mechanical means employed will effect a seal only after the backwash shoe and a particular backwash port or cell outlet are in alignment, thereby eliminating problems caused by continuous side loading on the traveling bridge, and also eliminating the need for wear strips on the shoe and on the channel wall. The face of the backwash shoe engaging the channel wall in accordance with this invention, is equipped with a resilient seal face or gasket (shaped to surround the cell outlet in the channel wall) to provide a compression type seal, and to account for minor imperfections in the channel wall.

In the preferred arrangement, an expandable bellows-type actuator is suspended from the bridge with the backwash pump and backwash shoe. The actuator is mechanically connected to the pump discharge pipe adjacent the backwash shoe. The actuator is also fluidly connected by a conduit to the backwash pump discharge. This entire assembly, including the backwash pump, discharge pipe, backwash shoe and bellows actuator, is carried at the lower end of a pair of parallel (in a transverse plane parallel to the cell partitions) support struts which are pivotally secured to the bridge and which extend vertically downwardly into the filtrate channel. In other words, the assembly is relatively loosely hung from the bridge such that the actuator can move the assembly toward the channel wall so that the backwash shoe gasket can sealingly engage the channel wall about individual cell ports in a manner described in greater detail further herein.

When the traveling bridge stops at a cell to be backwashed, the backwash shoe will be aligned with the cell port or outlet in the channel wall as a result of the sensing system which is part of the traveling bridge mechanism, but which is otherwise unrelated to this invention. At this point, the backwash pump is activated to apply flow and pressure to the backwash system. Since the bellows-type actuator is connected to the backwash pump discharge, it is pressurized and expanded smoothly as the pump comes up to operating pressure. The bellows is located such that one side pushes against the tank side wall, thus causing the other side of the bellows to push the backwash shoe toward the channel wall until the resilient gasket is sealed against the channel wall about the cell outlet.

When backwash of the cell is complete, the backwash pump is deenergized, relieving pressure on the bellows and disengaging the seal from the channel wall. This disengaging action of the shoe from the channel wall is assisted by a pair of springs compressing the bellows, and thus pulling the backwash shoe away from the wall. The bridge then travels to the next cell, and the process is repeated until all of the cells are backwashed.

In its broader aspects, therefore, the present invention relates to a traveling bridge filtration system comprising a tank configured to include a plurality of side-by-side filter cells all extending longitudinally in a first direction, and a common filtrate channel extending longitudinally in a second direction perpendicular to the first direction; each filter cell having an outlet extending through an interior wall of the tank thereby establishing fluid communication with the filtrate channel; a traveling bridge mounted atop the tank and movable from cell to cell in the second direction; a backwash pump having an inlet and a discharge pipe, the discharge pipe connected to a backwash shoe, the pump and shoe pivotally suspended from the bridge and located within the filtrate channel; and fluid means for moving the backwash shoe selectively into sealing engagement with a tank wall surface surrounding one of the filter cell outlets, the means responsive to actuation of the backwash pump.

In another aspect, the invention relates to a method of effecting sealing engagement between a backwash shoe and a filter cell outlet port in a traveling bridge filtration system which includes a tank configured to include a plurality of side-by-side filter cells all extending longitudinally in a first direction, and a common filtrate channel extending longitudinally in a second direction perpendicular to the first direction; each filter cell having an outlet extending through an interior wall of the tank thereby establishing fluid communication with the filtrate channel; a traveling bridge mounted atop the tank and movable from cell to cell in the second direction; a backwash pump having an inlet and a discharge pipe, the discharge pipe connected to a backwash shoe, said pump and shoe suspended from the bridge within the filtrate channel, the backwash pump including a discharge pipe connected between the pump and the backwash shoe; the method comprising (a) moving the bridge into alignment with a filter cell to be backwashed; (b) moving the backwash shoe into sealing engagement with a tank wall surface surrounding an outlet of the filter cell as a direct function of pressure developed in the backwash pump; (c) backwashing the filter cell; (d) relieving the pressure in the pump and disengaging the backwash shoe from the tank wall surface; and (e) moving the bridge to the next adjacent cell.

The above described invention has several advantages:

(1) positive sealing is effected between the backwash shoe and the backwash port or cell outlet, eliminating undesirable bypassing of backwash water;

(2) wear strip liners on the backwash shoe and the channel wall are eliminated through the use of an intermittently operated and mechanically actuated resilient seal;

(3) continuous spring mechanisms and resulting side load on the traveling bridge mechanism are eliminated;

(4) improved backwash efficiency is achieved as a result of the superior sealing design which insures all backwash water is directed into the filter bed;

(5) the positive, frictionless, wear-resistant mechanical sealing system actuated by hydraulic power inherent within the system requires no additional power source;

(6) a simplified design is provided with fewer sealing components; and (7) the system is easily retrofitted to existing systems utilizing the old seal designs.

Other objects and advantages of the invention will become apparent from the detailed description which follows.

DETAILED DESCRIPTION OF THE DRAWINGS

Figure 1:
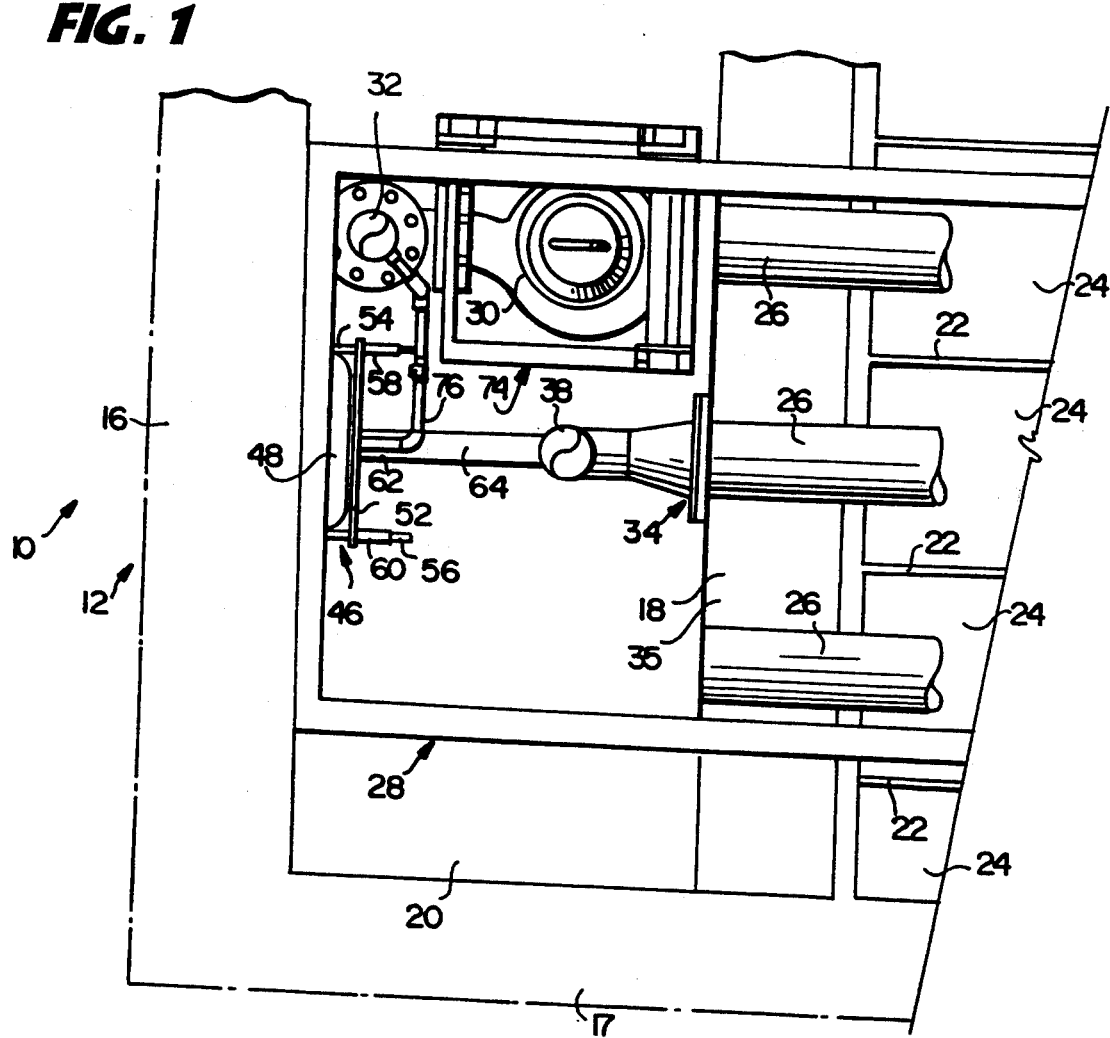
FIG. 1 is a partial plan view of a traveling bridge filtration system in accordance with this invention.

With reference to the drawings, and particularly FIG. 1, the tank 10 includes a peripheral wall 12 and a bottom wall 14 which together define an open-topped rectangular tank. The peripheral wall 12 includes a pair of side walls (one shown at 16), and a pair of end walls (one shown at 17). An interior partition wall 18 is spaced from, and extends parallel to the side wall 16 from between the end walls to define along with a portion of the peripheral wall 12 a filtrate channel 20 running along the length of the tank. Transverse cell partitions 22 define individual filter cells 24 which extend across the tank (perpendicular to the channel 20), between the interior partition, or channel wall 18 and the opposite side wall (not shown).

Each cell 24 may be provided with an underdrain header 26 which extends along the length of the cell and through the interior partition or channel wall 18. In this way, filtrate passing downwardly through the filter media in each cell will flow through the header 26, into the filtrate channel 20. For purposes of this invention, however, it is important to note that the cells 24 may drain directly through the channel wall 18 and into the filtrate channel 20, i.e., without a header 26. Thus, reference will be made herein to the cell outlet or port, embracing both a header 26 and a simple outlet port through the wall 18.

Figure 2:
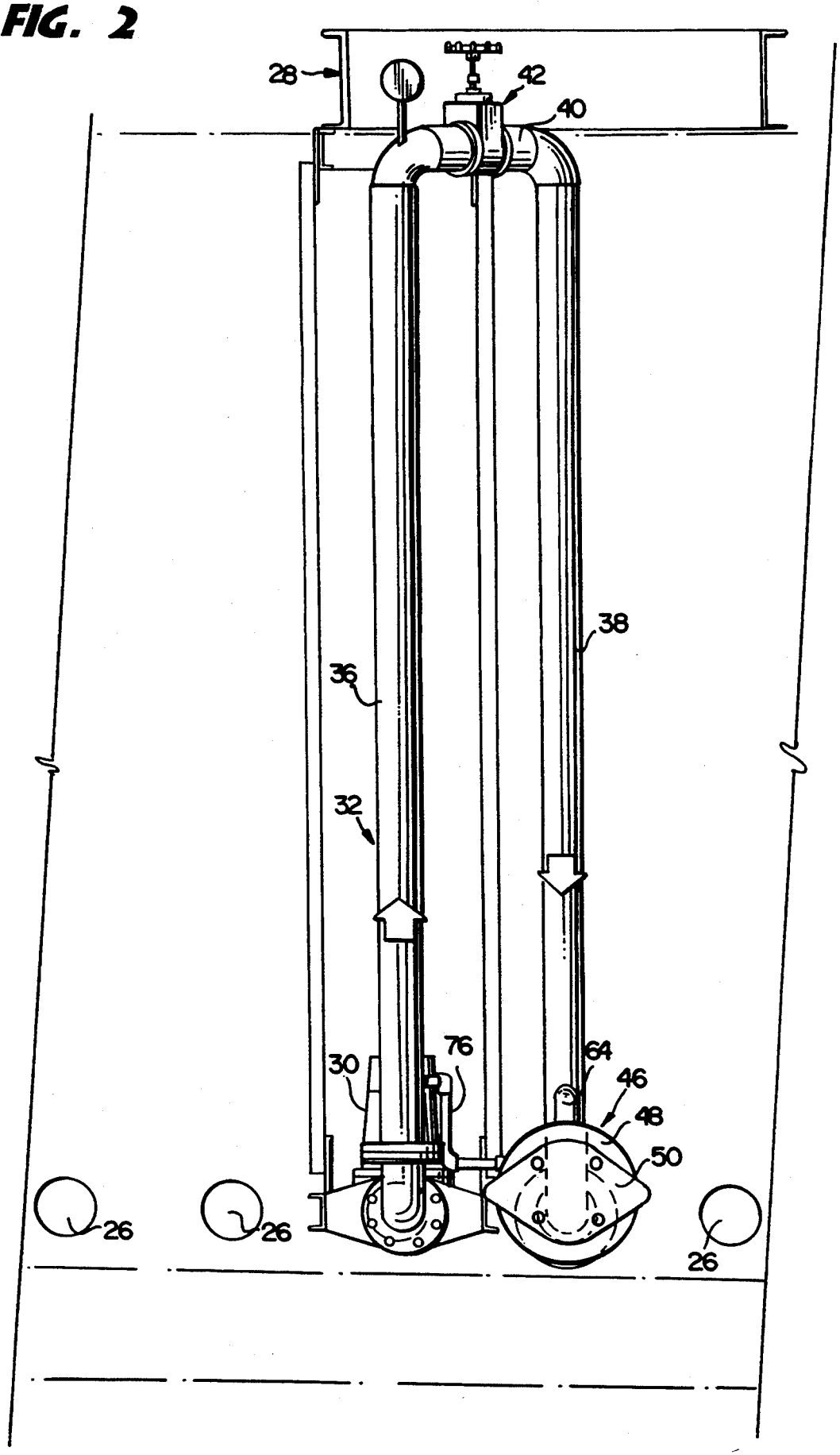
FIG. 2 is a partial front elevation of the system shown in FIG. 1.

A traveling bridge 28 is mounted atop the tank for movement between the end wall portions of the tank, i.e., in a direction perpendicular to the transversely extending cells 24. The bridge, also of conventional construction, supports a submersible backwash pump 30 within the channel 20 to enable each of the cells 24 to be backwashed, in succession, as the bridge 28 moves from cell to cell. The pump 30 includes an inlet through which it receives filtrate from the channel 20, and a discharge pipe 32 which is arranged in an inverted U-configuration best seen in FIG. 2. The discharge pipe 32 terminates at a backwash shoe 34 which is adapted to align with respective headers 26 or outlets of the cells 24.

It will be appreciated that the backwash operation per se is known, wherein filtrate from channel 20 is pumped through discharge pipe 32, into a header 26 or cell outlet and then upwardly through the cell 24 in a direction counter to the normal filtration flow direction, to be collected and removed via a collection hood (not shown) also suspended from the bridge. This invention is specifically concerned with the manner in which the backwash shoe 34 sealingly engages an outside surface 35 of the interior partition or channel wall 18, about the individual cell outlets.

As noted above, the discharge pipe 32 is configured in an inverted U-slope, with an upward leg 36, a downward leg 38 and a connecting leg 40 to include a backwash flow control valve 42. The backwash shoe 34 at the lower free end of downward leg 38 includes a resilient, annular gasket 44 which is urged into sealing engagement with outside surface 35 of the channel wall 18 after the shoe 24 is aligned with a header 26. The sealing engagement of gasket 44 with surface 35 is carried out by a bellows actuator assembly 46. This assembly includes a bellows or expandable diaphragm 48 (made from any suitable, commercially available material) secured between a pair of plates 50, 52 which are connected by rods 54, 56. The rods 54, 56 extend beyond the plate 52 and each supports an actuator return spring 58, 60, respectively. These springs, which are preferably coil springs telescoped over the respective rods, are secured to the rod ends so as to exert a compressive force on the bellows (to the left as viewed in FIGS. 1, 3 and 4), as described in greater detail below.

Figure 3:
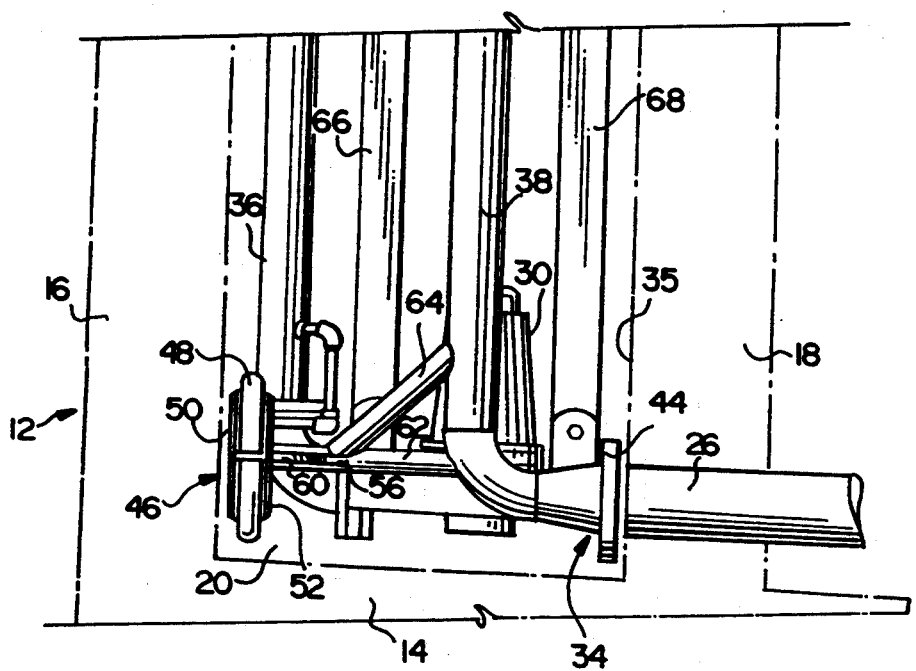
FIG. 3 is a partial side elevation of the system shown in FIG. 1; with the backwash shoe shown in a non-sealing position.
Figure 4:
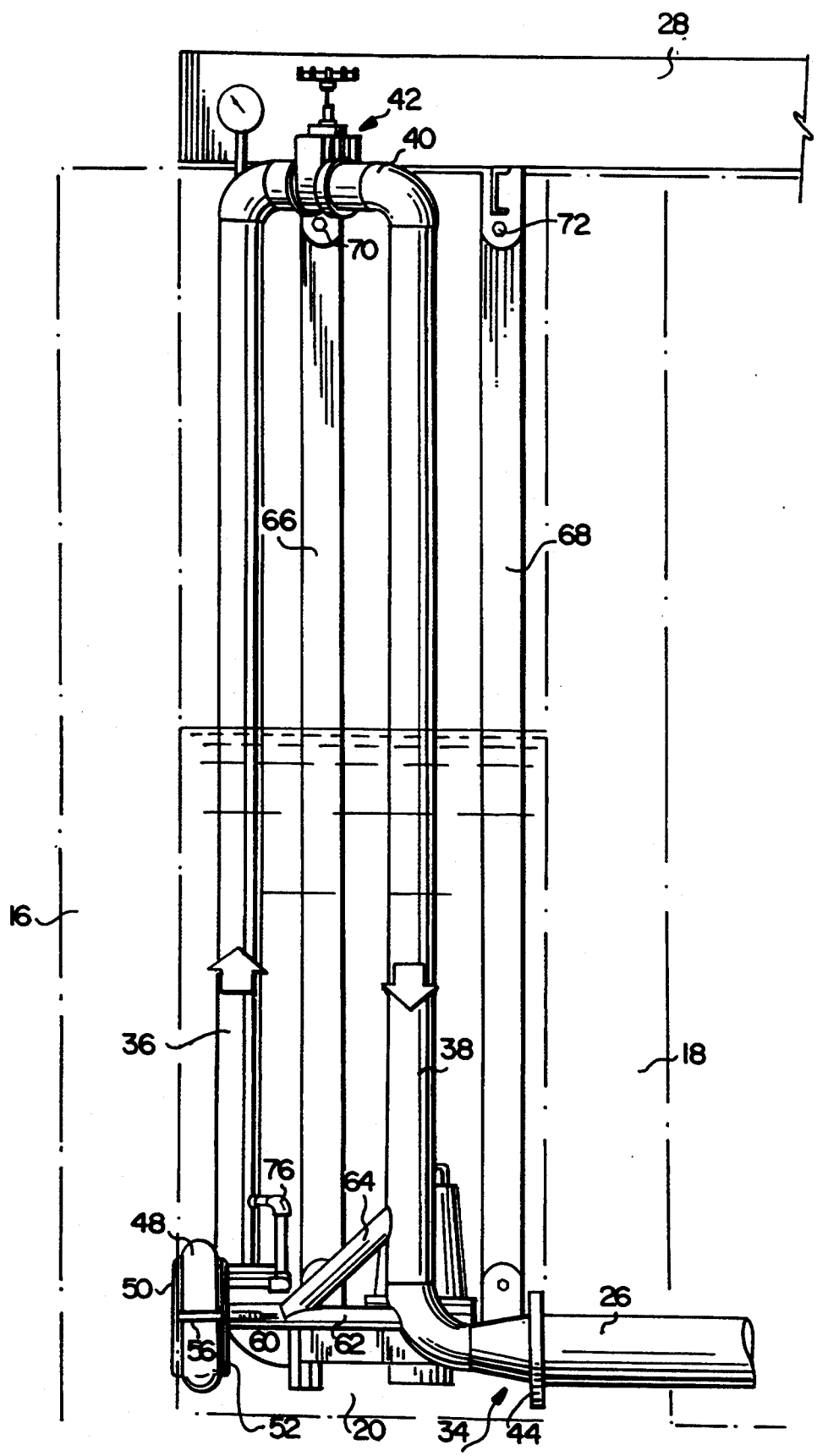
FIG. 4 is a partial side elevation similar to FIG. 3 but with the backwash shoe in a sealing or engaged position.

The bellows plate 52 is fixed to an actuator support or thrust rod 62 which, in turn, is fixed to the downward leg 38 of pipe 32, adjacent the backwash shoe 34. Rod 62 is braced by a reinforcing strut 64 extending between the support 62 and the downward leg 38, as best seen in FIG. 3.

The entire assembly comprising the backwash pump 30, discharge pipe 32, backwash shoe 34 and actuator assembly 46 is carried at the lower end of two, parallel supporting struts 66, 68 which are pivotally secured to the bridge by pins 70, 72. These struts extend vertically downwardly into the filtrate channel and support a substantially square frame 74 (see FIG. 1) which, in turn, carries the backwash pump 30. As will be appreciated from FIGS. 1 and 2, the discharge pipe 32, backwash shoe 34 and actuator assembly 46 are cantilevered from the pump 30 and frame 74. A pressure connector line 76 extends between the upward leg 36 of the discharge pipe 32 (proximate the pump 30) and the actuator assembly 46 so that, upon actuation of the pump 30 under the control of valve 42, the bellows 48 is expanded by reason of back pressure developed in the pump transmitted via line 76 (against the counter biasing force of springs 58, 60), to move the shoe 24 to the right, from the position shown in FIG. 3 to the position shown in FIG. 4.

In use, the bridge 28 will move to a position over a filter cell to be backwashed, and the collector hood on the bridge will be moved into position over the cell. At the same time, the backwash shoe will be aligned with the cell header or outlet 26 within the filtrate channel 20. The backwash pump 30 will then be actuated under the control of valve 42. This is a low pressure system which requires only about 5 lbs. of pressure to run the pump 30 and to expand the bellows actuator 48. When the pump comes up to pressure, the bellows or diaphragm 48 will expand, causing the gasket 44 to engage and seal to the surface 36 of channel wall 18 about a respective cell outlet or header 26. It will be noted that the bellows actuator assembly 46 is positioned close to the tank side wall 16 so that plate 50, upon expansion of bellows 48, will push against the wall surface of the tank side wall 16, thereby driving the shoe 34 via thrust rod 62, in the opposite, sealing direction. Movement of the shoe 34 and gasket 44 is made possible by the manner in which the pump and shoe assembly is "hung" from the bridge. As a practical matter, the assembly, which is suspended about seven feet below the bridge 28, need only move laterally about two inches between a non-sealing position and a sealing position.

The resiliency of gasket 44 (which may comprise a BUNA-N elastomer) insures good sealing even with minor imperfections in the surface 35 of wall 18. After the backwash operation is completed, the pressure in line 76 is relieved, thus allowing the bellows 48 to contract. Upon release of this pressure, springs 58, 60 compress the bellows back to the position illustrated in FIG. 3, disengaging the shoe 24 from the channel wall 18. The bridge 28 is then indexed automatically to the next cell and the process repeated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A traveling bridge filtration system comprising a tank having a peripheral wall, a bottom wall and a plurality of parallel cell partitions configured to define a plurality of side-by-side filter cells all extending longitudinally in a first direction, and a common filtrate channel extending longitudinally in a second direction perpendicular to said first direction, said filtrate channel defined in part by a substantially vertical interior partition extending substantially perpendicular to said cell partitions and in part by said peripheral wall; each filter cell having an outlet extending through said interior partition thereby establishing fluid communication between each of said cells and said filtrate channel; a traveling bridge mounted atop said tank and movable from cell to cell in said second direction; a backwash pump having an inlet and a discharge pipe, the discharge pipe connected to a backwash shoe, said backwash pump and backwash shoe pivotally suspended from said bridge and located within said filtrate channel; and means for pivotally moving said backwash shoe selectively into sealing engagement with an outside surface of said interior partition surrounding a respective one of said filter cell outlets, said means responsive to pressure developed by actuation of said backwash pump.

2. The traveling bridge filtration system of claim 1 wherein said means includes a bellows actuator including an expandable chamber, and a thrust rod extending between said actuator and said backwash shoe.

3. The traveling bridge filtration system of claim 2 wherein said expandable chamber is sandwiched between a pair of plates, one plate adapted to engage a surface of said peripheral wall partly forming the filtrate channel and the other plate secured to said thrust rod.

4. The traveling bridge filtration system of claim 3 and including resilient means for causing said backwash shoe to disengage from said outside surface of said interior partition upon deactivation of said pump.

5. The traveling bridge filtration system of claim 2 wherein said means further includes a pressure connector line extending between said discharge pipe and said bellows actuator.

6. The traveling bridge filtration system of claim 5 wherein a backwash flow control valve is located in said discharge pipe downstream of said pressure connector line and upstream of said backwash shoe.

7. The traveling bridge filtration system of claim 2 wherein each cell outlet comprises a header extending along the bottom of the cell.

8. The traveling bridge filtration system of claim 1 wherein said pump and backwash shoe assembly is suspended from said bridge by a pair of parallel struts pivotally mounted to said bridge.

9. The traveling bridge filtration system of claim 1 wherein said backwash shoe is fitted with a resilient gasket for sealingly engaging said outside surface of said interior partition.

10. A traveling bridge filtration system comprising a tank having a peripheral wall, a bottom wall and a plurality of parallel cell partitions configured to define a plurality of side-by-side filter cells all extending longitudinally in a first direction, and a common filtrate channel extending longitudinally in a second direction perpendicular to said first direction, said filtrate channel defined in part by a substantially vertical interior partition extending substantially perpendicular to said cell partitions and in part by said peripheral wall; each filter cell having an outlet extending through said interior partition thereby establishing fluid communication between each of said cells and said filtrate channel; a traveling bridge mounted atop said tank and movable from cell to cell in said second direction; a backwash pump having an inlet in communication with said filtrate channel and a discharge pipe, the discharge pipe connected to a backwash shoe; said backwash shoe pivotally suspended from said bridge and located within said filtrate channel; and means for pivotally moving said backwash shoe selectively into sealing engagement with an outside surface of said interior partition surrounding a respective one of said filter cell outlets, said means responsive to pressure developed by actuation of said backwash pump.

11. In a travelling bridge filtration system wherein at least one filter cell containing filter media is backwashed in a direction opposite a normal filtration direction by a backwash pump having a pump outlet connected to a backwash shoe engageable with an outlet of said at least one filter cell, said backwash shoe including a mechanical actuator assembly for moving said shoe into engagement with said outlet; and a pump inlet connected to a source of backwash liquid, the improvement wherein a pressure line extends between said backwash pump and said mechanical actuator assembly such that said backwash shoe is movable into engagement with said outlet of said at least one filter cell by pressure developed in said backwash pump.

* * * * *